US009995181B2

(12) United States Patent
Miller et al.

(10) Patent No.: US 9,995,181 B2
(45) Date of Patent: Jun. 12, 2018

(54) EXHAUST IMPINGEMENT COOLING

(75) Inventors: Daniel N. Miller, Bainbridge Island, WA (US); Neal D. Domel, Aledo, TX (US); Dan J. Baruzzini, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 736 days.

(21) Appl. No.: 13/307,741

(22) Filed: Nov. 30, 2011

(65) Prior Publication Data
US 2013/0133857 A1 May 30, 2013

(51) Int. Cl.
*F01D 25/30* (2006.01)
*F02K 1/40* (2006.01)
*F02K 1/82* (2006.01)

(52) U.S. Cl.
CPC .............. *F01D 25/305* (2013.01); *F02K 1/40* (2013.01); *F02K 1/822* (2013.01); *Y02T 50/672* (2013.01); *Y02T 50/675* (2013.01)

(58) Field of Classification Search
CPC .......... F01D 25/305; F02K 1/40; F02K 1/822
USPC ............. 60/39.5, 231, 770; 239/127.1, 127.3
See application file for complete search history.

(56) References Cited

U.S. PATENT DOCUMENTS

| | | | |
|---|---|---|---|
| 1,487,594 A | 3/1924 | Paul et al. | |
| 3,195,678 A * | 7/1965 | Morgan et al. | 181/221 |
| 4,713,933 A | 12/1987 | Bandera | |
| 5,894,990 A | 4/1999 | Glezer et al. | |
| 6,896,475 B2 * | 5/2005 | Graziosi et al. | 415/1 |
| 7,841,186 B2 * | 11/2010 | So et al. | 60/785 |
| 8,257,025 B2 * | 9/2012 | Little et al. | 415/115 |
| 2009/0263243 A1 * | 10/2009 | Little et al. | 415/216.1 |
| 2009/0314885 A1 | 12/2009 | Leland et al. | |

OTHER PUBLICATIONS

Chiekh et al., "Synthetic Jet Control for Flows in a Diffuser: Vectoring, Spreading and Mixing Enhancement", Journal of Turbulence, vol. 32, Dec. 2003, pp. 1-12.*
"Selecting a Fan for Your Thermal Management System (part 2 of 2)", published on Jun. 15, 2011 [http://www.qats.com/cms/2011/06/15/selecting-a-fan-for-your-thermal-management-system-part-2-of-2/], pp. 1-4.*
Lefebvre, A.H., Gas Turbine Combustion, Second Edition, Taylor & Francis, Philadelphia, 1998, p. 88.*
Harris, et al., "A Performance Evaluation of a Three Splitter Diffuser and Vaneless Diffuser Installed on the Power Turbine Exhaust of a TF4OB Gas Turbine", ASME, 98-GT-284, 1998, pp. 1-6.*

(Continued)

*Primary Examiner* — Lorne Meade
(74) *Attorney, Agent, or Firm* — Reising Ethington P.C.

(57) ABSTRACT

An exhaust impingement cooling device for reducing heating effects of an exhaust plume on an impinged surface. An exhaust nozzle exit screen is positioned across an exhaust plume flow path, and includes a plurality of flowpath diverging apertures that spread at least a portion of an exhaust plume that is being emitted along the exhaust plume flow path from an exhaust plume source. Flow control jets are arrayed within the exhaust plume flow path in respective positions where their operation will augment the flow of exhaust plume gases through the screen, thereby increasing the momentum and mixing of the exhaust plume with cooler ambient air.

13 Claims, 5 Drawing Sheets

(56) References Cited

OTHER PUBLICATIONS

Heavy Duty Gas Turbine Products, GE Energy, GEA-12985H, Jun. 2009, pp. 1-24.*
"Saudi Electricity Company, GE Sign Agreement Totaling Almost $300 Million for Six Power Plant Expansions", Dec. 5, 2011, [accessed on Feb. 19, 2017 at http://www.businesswire.com/news/home/20111205005460/en/Saudi-Electricity-Company-GE-Sign-Agreement-Totaling].*

* cited by examiner

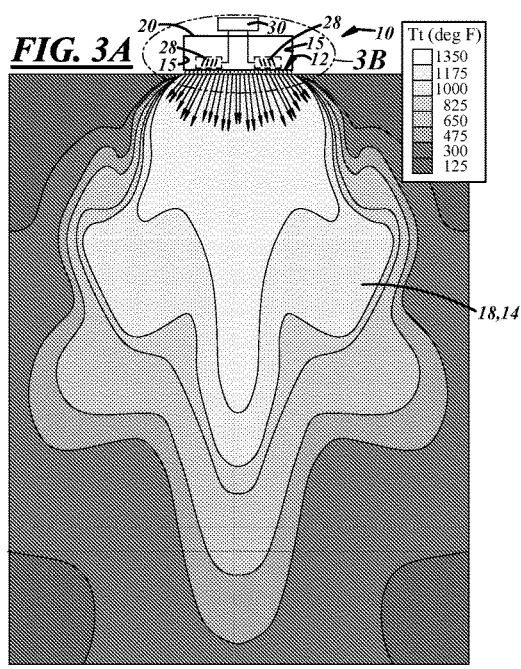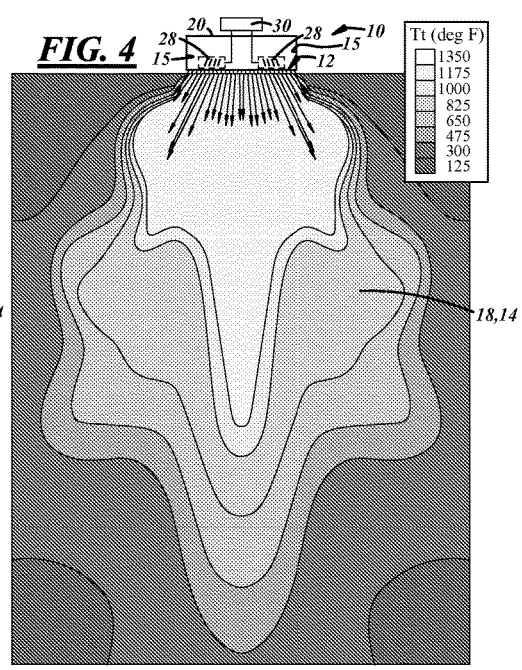

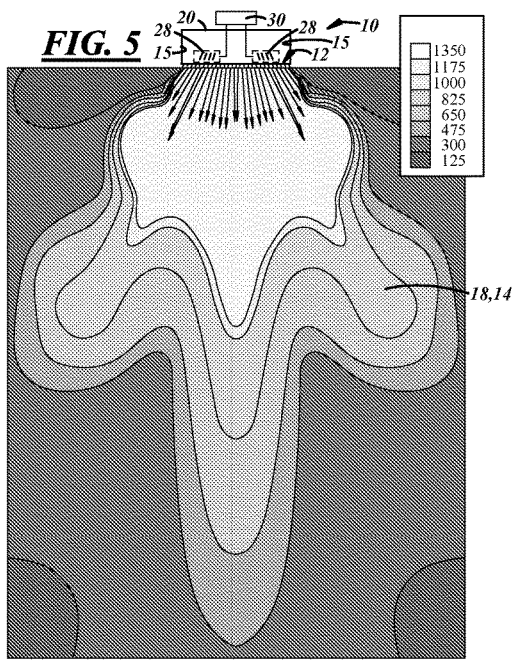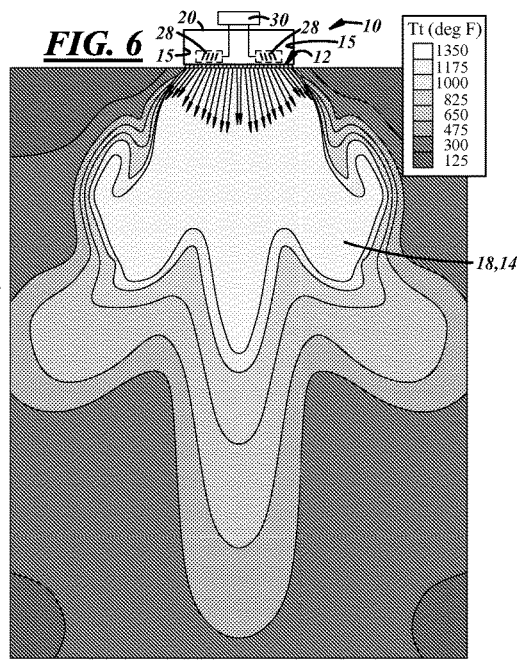

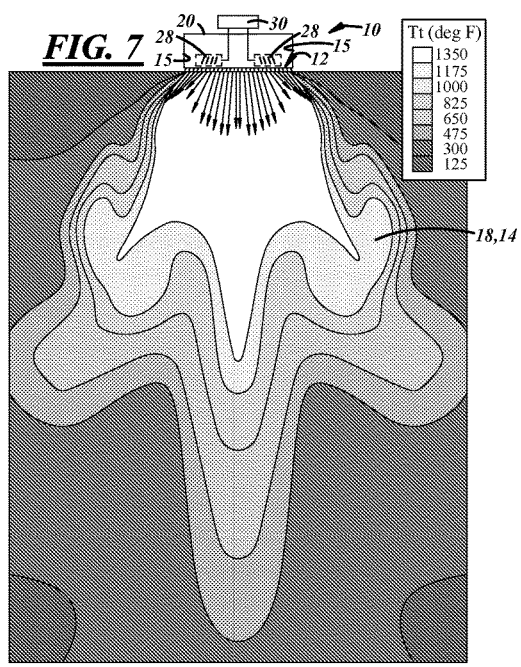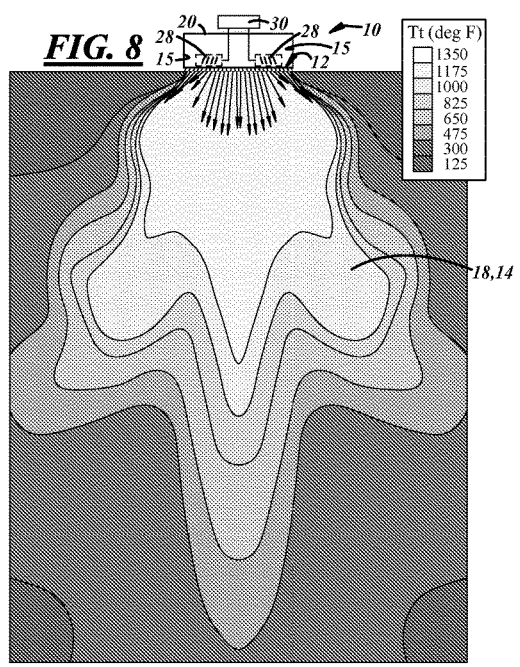

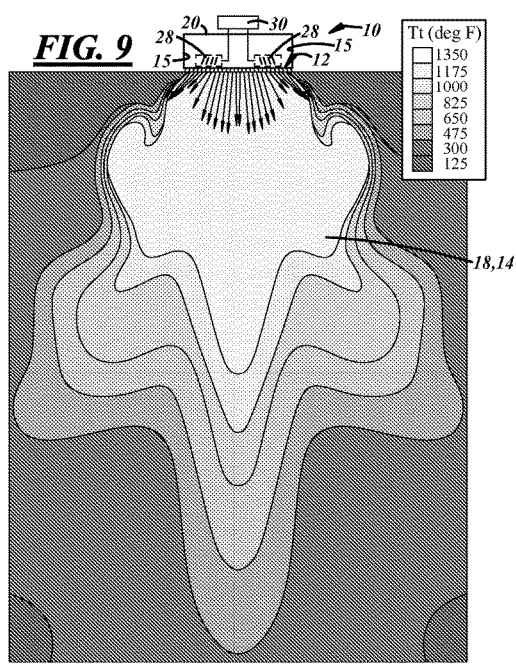
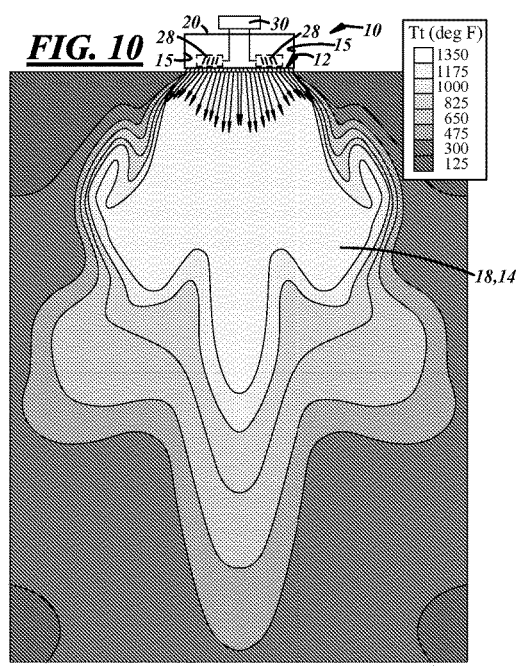

EXHAUST IMPINGEMENT COOLING

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to exhaust impingement cooling and the reduction of heating effects of an exhaust plume on an impinged surface.

Description of Related Art Including Information Disclosed Under 37 CFR 1.97 and 1.98

Reducing excessive heating effects of exhaust systems presents a major challenge for next-generation air vehicle systems. Tomorrow's air vehicles will be required to manage increasing levels of thermal, mechanical, and electrical power. This need arises from demands for advanced propulsion, aerodynamics, sensor, and weapon/payload capability necessary to defeat threats, perform with greater fuel efficiency, reduce noise and emissions, and decrease life cycle cost.

Emerging technologies of interest, such as advanced engines, high power sensors, directed energy weapons, and enhanced electronic actuation, will require much more power than today's systems. The heat load generated from these emerging power system technologies will need to be removed from an air vehicle using one or more exhaust nozzles.

While demand for power management functionality grows, there is also an emerging design trend toward embedding or highly integrating propulsion and power systems such that exhaust apertures are directed downward from a vehicle. This trend will likely present airframe designers with significant challenges in meeting heating constraints driven by peak allowable temperatures for impinged surfaces (limited by tarmac/runway material temperature limits).

There is also an emerging design trend toward embedding or highly integrating propulsion and power systems such that exhaust apertures are directed upward from a vehicle such that peak allowable temperatures for adjacent upper aircraft component surfaces, limited by adjacent airframe composite materials, for example; becomes an issue.

SUMMARY

An exhaust impingement cooling device for reducing heating effects of an exhaust plume on an impinged surface may comprise an exhaust nozzle exit screen configured to be positioned across the exhaust plume flow path. The exit screen may include a plurality of flowpath diverging apertures positioned to spread at least a portion of an exhaust plume that is being emitted along the exhaust plume flow path from an exhaust plume source. The device may also include a plurality of flow control jets arrayed within the exhaust plume flow path in respective positions where their operation will entrain and enhance the flow of exhaust plume gases through the screen, thereby increasing the momentum and mixing of the exhaust plume with cooler ambient air.

DRAWING DESCRIPTIONS

These and other features and advantages will become apparent to those skilled in the art in connection with the following detailed description and drawings of one or more embodiments of the invention, in which.

Figure 1:
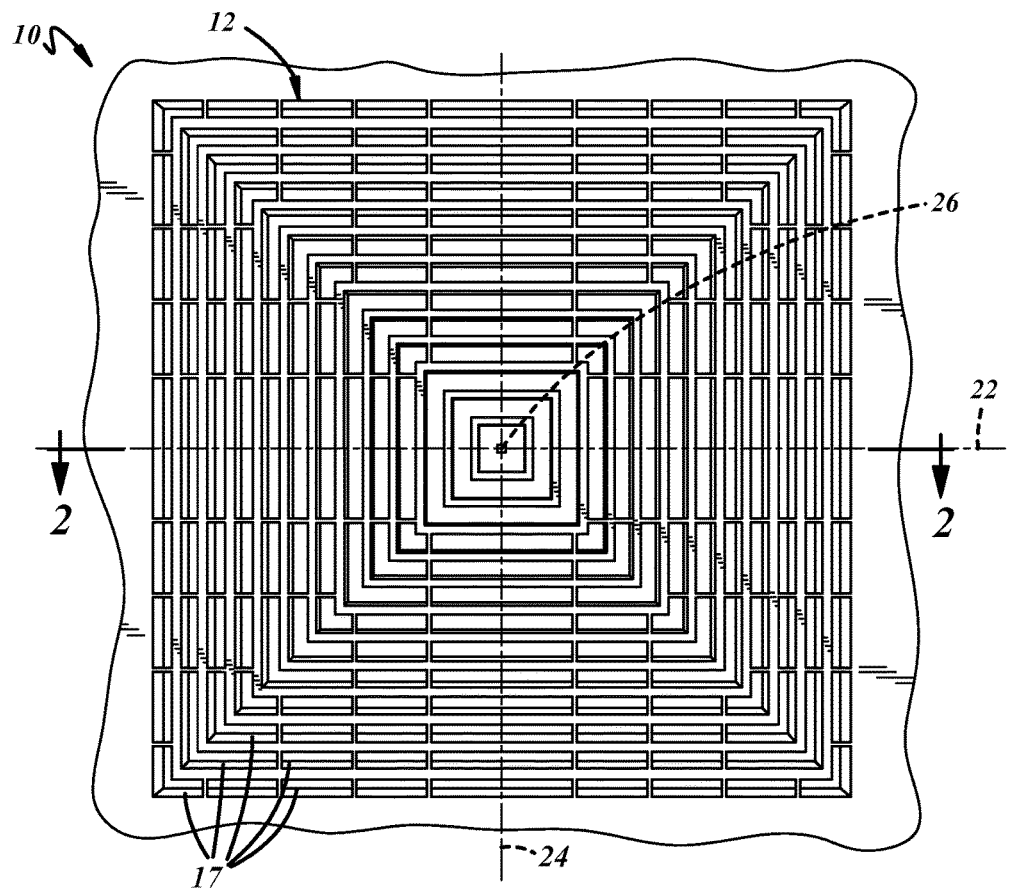
FIG. 1 is a top view of an exhaust nozzle exit screen of an exhaust impingement cooling device.
Figure 2:
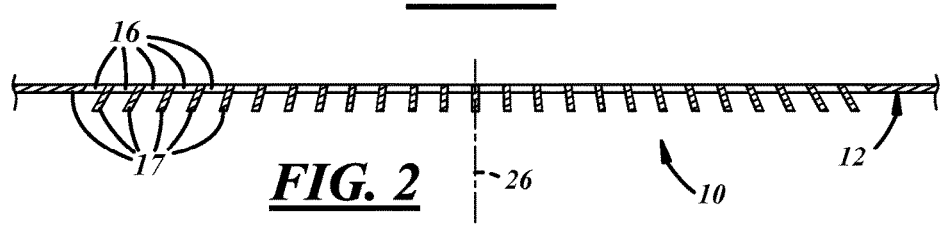
FIG. 2 is a cross-sectional view of the exhaust nozzle exit screen of FIG. 1 taken along line 2-2 of FIG. 1.
Figure 3B:
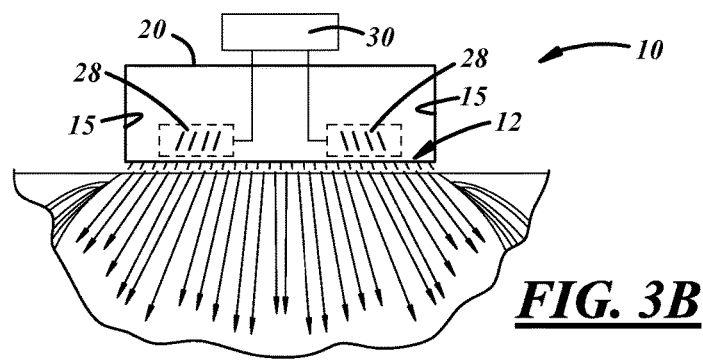

FIG. 3A is the first of 8 time sequenced figures showing a side view of an exhaust plume shown passing through an exhaust impingement cooling device with the exhaust nozzle exit screen of FIGS. 1 and 2 disposed across an exhaust plume flow path that is occupied by the exhaust plume at divergence angles ranging from zero degrees at a center of the screen to 30 degrees around the outer edges of the screen, and, in this figure, further showing a plurality of flow control jets arrayed upstream from the screen and shown paused following an inhalation portion and in advance of an exhalation portion of an inhalation-exhalation cycle;

FIG. 3B is a magnified schematic view of region 3B of FIG. 3A showing a plurality of flow control jets arrayed upstream from the exhaust nozzle exit screen;

FIG. 4 is the second of the 8 time sequenced figures and shows the reaction of the plume to the plurality of flow control jets initiating the exhalation portion of their inhalation-exhalation cycle;

FIG. 5 is the third of the 8 time sequenced figures and shows the reaction of the plume to the plurality of flow control jets completing the exhalation portion of their cycle;

FIG. 6 is the fourth of the 8 time sequenced figures and shows the reaction of the plume to the plurality of flow control jets pausing between the exhalation portion and an inhalation portion of their cycle;

FIG. 7 is the fifth of the 8 time sequenced figures and shows the reaction of the plume to the plurality of flow control jets initiating the inhalation portion of their cycle;

FIG. 8 is the sixth of the 8 time sequenced figures and shows the reaction of the plume to the plurality of flow control jets at an approximate midpoint of the inhalation portion of the jets' cycle;

FIG. 9 is the seventh of the 8 time sequenced figures and shows the reaction of the plume to the plurality of flow control jets toward the end of the inhalation portion of their cycle; and FIG. 10 is the eighth of the 8 time sequenced figures and shows the reaction of the plume to the plurality of flow control jets pausing following the inhalation portion of their cycle and before initiating another exhalation portion of the cycle.

DETAILED DESCRIPTION

An exhaust impingement cooling device for reducing heating effects of an exhaust plume on an impinged surface is generally shown at 10 in FIGS. 3A-10. The device 10 may include an exhaust nozzle exit screen, shown at 12 in FIGS. 1-10, which may be positioned across and generally normal to a direction of flow of an exhaust plume flow path 14, and that may include a plurality of flowpath diverging apertures 16. As is also shown in FIGS. 3A-10, a portion of the exhaust plume flow path 14 passing through the device may be defined by an outer peripheral wall 15. The flowpath apertures 16 may be round or polygonal in cross section or any other suitable shape. The flowpath apertures 16 may comprise respective turning vane or louver surfaces 17 positioned to spread at least a portion of an exhaust plume 18 that is being emitted along the exhaust plume flow path 14 from an exhaust plume source 20. The plume 18 may be spread in such a way as to increase mixing and diffuse the temperature of the exhaust gas impinging on external surfaces.

As shown in FIG. 1 the exhaust nozzle exit screen 12 may have a generally rectangular, e.g., square, cross-sectional shape that may be generally coextensive with that of an exhaust plume flow path 14 across which the screen 12 is to be disposed. In this case, and as best shown in FIG. 2, the screen 12 may be configured to spread the plume 18 in directions away from two imaginary planes 22, 24 that are disposed parallel to and are intersecting the plume axis 26, and that are perpendicular to one another. In other embodiments, the screen 12 may spread a plume 18 in any manner suited to the cross-sectional shape of any exhaust plume flow path 14, (e.g., elliptical, circular, semi-circular, etc.) In still other embodiments, the exhaust nozzle exit screen 12 may spread a plume 18 in one or more preferred directions, which may include configuring the device 10 to prevent the plume 18 from spreading in one or more directions.

Flow control jets 28 may be arrayed within the exhaust plume flow path 14 in respective positions where their operation will entrain (i.e., help "pump" or otherwise augment) the flow of exhaust plume gases through at least a portion of the screen 12. The flow control jets 28 may thus compensate for mass flow impedance caused by respective divergent orientations of the flowpath diverging apertures 16 and/or may enhance overall mass flow of an exhaust plume 18 beyond what it would have been had there been no exit screen 12 present.

As shown in FIGS. 3-10 the flow control jets 28 may be distributed across the exhaust plume flow path 14 at an optimum distance upstream from the exhaust nozzle exit screen 12 to minimize the amount of impedance the jets introduce when they are not actively augmenting mass flow. In other words, the flow control jets 28 may be spaced axially from the screen 12 so that they can't cooperate with the screen to form significant areas of mass flow blockage. The jets 28 may be supported in such respective upstream positions by any suitable means known in the art for supporting such jets in the path of an exhaust plume.

The control jets 28 may comprise zero-net-mass-flux (ZNMF) actuators and their distribution upstream of the exhaust nozzle exit screen 12 may be particularly advantageous where the control jets 28 comprise ZNMF actuators because an upstream location can boost the effectiveness of ZNMF actuation. This is because, when the actuators 28 are drawing in fluid or "inhaling", they draw the fluid from upstream of the actuator 28, pulling in the same direction as—and thereby directly augmenting—the main fluid flow. Then, when the actuators 28 are expelling fluid or "exhaling", they push the fluid flow downstream in the same direction.

If, instead, ZNMF actuators 28 were positioned too close to the screen apertures 16, the actuators 28 could interfere with fluid flow during the respective "inhale" parts of their cycles. When placed too close to the screen 12, actuators 28 would inhale the flows that they had just exhaled, thus rendering them less effective at maintaining flow in the desired exhaust flow direction.

If control jets 28 were steady or pulsed (rather than ZNMF), then they would likely provide peak performance when active if positioned closer to diverging apertures 16 and/or integrated with louver surfaces 17. However, blockage would likely occur whenever the control jets 28 in this location were turned off. Therefore, a more recessed position is the optimum location for ZNMF jets when active or turned off, but a compromise for steady or pulse jets.

Screen apertures 16 configured to turn flow with no actuation are known to work well for the turning/spreading of an exhaust plume 18 having sufficiently high momentum. However, for low momentum exhaust flow, louver surfaces 17 oriented in such a way as to turn flow could cause blockage and back-pressurize a system, which would compensate, if there were no actuation, by reducing the flow rate and/or increasing the source pressure. Positioning ZNMF actuators 28 at an optimum distance upstream improves the operability of turning vanes 17 in an exhaust plume 18 having low-momentum exhaust flow, by boosting flow momentum in the plume 18 when the actuators 28 are active, and by minimizing blockage when the actuators 28 are not active.

The device 10 may include a flow control actuator 30 configured to selectively actuate the control jets 28 to force air through the exhaust nozzle exit screen 12 when necessary or desirable to overcome flow impedance (i.e., when back-pressure is to high to allow the exhaust plume 18 to spread through the screen 12 without assistance). The flow control actuator 30 may shut off the control jets 28 when jet actuation is not necessary or desirable to overcome flow impedance (i.e., when natural back-pressure is low enough to allow the exhaust plume 18 to spread through the screen 12 without assistance). The frequency of the actuation may be pre-set to an optimum value and may be scheduled for conditions known to produce low-momentum exhaust. However, in other embodiments activation may occur in response to signals received from a sensor that detects whether or not a desired amount of mass flow is being exhausted from the system.

The control jets 28 may be configured to provide pulsed flow injections. As shown in the time sequenced drawings of FIGS. 3-10, the pulsing of the jets 28 may introduce beneficial mixing structures into a plume 18. In this configuration, the flow control actuator 30 may be a pulsing actuator connected to the control jets 28 that selectively pulses the control jets. For example, the actuator 30 may use selective pulsing to control a plume vector, or a plume spreading bias. The flow control actuator 30 may sequence the control jets 28 in such a way as to, for example, introduce small rapid changes in plume vector direction optimized to increase overall mixing. The flow control actuator 30 may also pulse the control jets 28 in unison to maintain the plume axis 26 along a specified vector and to offer more control over the direction in which the screen 12 spreads the plume 18. The control jets 28 and flow control actuator 30 may further be configured and operated in such a way as to preclude flow reversal at the screen even when the jets 28 are inhaling. As shown in FIGS. 7-9, when the jets 28 are inhaling, the velocity at the screen nearest the actuators reduces in magnitude but the flow remains downstream.

A device constructed as described above both increases the mass flow, and diverges or spreads the cross section of an exhaust plume, speeding mixing of the exhaust gases, and reducing the temperature of the plume. Optimally-placed actuators also allow the device to clear flow blockages, overcome back pressure, and actively control and/or adjust the plume vector without creating significant flow impedance during inactive periods.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An exhaust impingement cooling device for reducing heating effects of an exhaust plume on an impinged surface, the device comprising:

an exhaust nozzle exit screen positioned across an exhaust plume flow path, and including a plurality of flowpath diverging apertures configured to spread at least a portion of an exhaust plume that is being emitted along the exhaust plume flow path from an exhaust plume source; and a plurality of flow control jets arrayed within the exhaust plume flow path in respective positions where their operation will entrain a flow of exhaust plume gases through the exhaust nozzle exit screen, thereby increasing the momentum and mixing of the exhaust plume with cooler ambient air.

2. An exhaust impingement cooling device as defined in claim 1 in which the exhaust nozzle exit screen is configured to spread the exhaust plume radially outward relative to a central plume axis.

3. An exhaust impingement cooling device as defined in claim 1 in which the exhaust nozzle exit screen is configured to spread the exhaust plume away from one or more imaginary planes parallel to and intersecting the plume axis.

4. An exhaust impingement cooling device as defined in claim 1 in which the exhaust nozzle exit screen is configured to spread the exhaust plume in one or more preferred directions.

5. An exhaust impingement cooling device as defined in claim 1 in which the flow control jets are distributed across the exhaust plume flow path upstream of the exhaust nozzle exit screen.

6. An exhaust impingement cooling device as defined in claim 5 in which the flow control jets are mounted at an optimum distance upstream from the exhaust nozzle exit screen to minimize the amount of impedance the jets introduce when they are not actively augmenting mass flow.

7. An exhaust impingement cooling device as defined in claim 5 in which the control jets comprise zero-net-mass-flux (ZNMF) actuators.

8. An exhaust impingement cooling device as defined in claim 5 in which the device includes a flow control actuator configured to selectively actuate the control jets to force air through the exhaust nozzle exit screen when necessary or desirable to overcome flow impedance, and to shut off the control jets when jet actuation is not necessary or desirable to overcome flow impedance.

9. An exhaust impingement cooling device as defined in claim 5 in which the control jets are configured to provide pulsed flow injections.

10. An exhaust impingement cooling device as defined in claim 8 in which the flow control actuator is a pulsing actuator connected to the control jets and configured to selectively pulse the control jets.

11. An exhaust impingement cooling device as defined in claim 10 in which the flow control actuator is configured to sequence the control jets.

12. An exhaust impingement cooling device as defined in claim 10 in which the flow control actuator is configured to pulse the control jets in unison.

13. An exhaust impingement cooling device as defined in claim 1 in which at least one of the flow control jets is spaced from any wall or walls defining the exhaust plume flow path.

* * * * *